United States Patent
Rao et al.

(10) Patent No.: US 9,497,188 B2
(45) Date of Patent: Nov. 15, 2016

(54) OFFLINE AUTHENTICATION WITH EMBEDDED AUTHORIZATION ATTRIBUTES

(71) Applicants: Ramdas Sitaram Rao, Brighton, MA (US); David James Mitton, North Andover, MA (US)

(72) Inventors: Ramdas Sitaram Rao, Brighton, MA (US); David James Mitton, North Andover, MA (US)

(73) Assignee: ERICSSON INC, Plano, TX (US)

( * ) Notice: Subject to any disclaimer, the term of this patent is extended or adjusted under 35 U.S.C. 154(b) by 16 days.

(21) Appl. No.: 14/396,693

(22) PCT Filed: Mar. 22, 2013

(86) PCT No.: PCT/US2013/033524
§ 371 (c)(1),
(2) Date: Oct. 23, 2014

(87) PCT Pub. No.: WO2013/142802
PCT Pub. Date: Sep. 26, 2013

(65) Prior Publication Data
US 2015/0128254 A1     May 7, 2015

Related U.S. Application Data

(60) Provisional application No. 61/614,651, filed on Mar. 23, 2012.

(51) Int. Cl.
H04L 29/06        (2006.01)
G06F 21/31        (2013.01)

(52) U.S. Cl.
CPC .............. *H04L 63/083* (2013.01); *G06F 21/31* (2013.01); *G06F 2221/2137* (2013.01)

(58) Field of Classification Search
None
See application file for complete search history.

(56) References Cited

U.S. PATENT DOCUMENTS 6,601,175 B1    7/2003   Arnold et al.
7,314,169 B1    1/2008   Jasper et al.
(Continued)

OTHER PUBLICATIONS

International Search Report dated Jul. 5, 2013 corresponding to International Patent Application No. PCT/US2013/033524; 3 pages.
(Continued)

*Primary Examiner* — Christopher Revak

(57) ABSTRACT

There is provided a method that includes (a) including in a dataset, data indicative of a time, (b) executing a hash function on the dataset to yield a hash value, and (c) employing the hash value as a password for a user to access a device. There is also provided a method that includes (a) including in a dataset, data indicative of a time, (b) executing a hash function on the dataset to yield a hash value, (c) determining that the hash value matches a password from a user, and (d) granting to the user, access to a device. There are also provided systems that perform the methods and storage devices that contain instructions for causing processors to perform the methods.

9 Claims, 7 Drawing Sheets

(56) References Cited

U.S. PATENT DOCUMENTS

| | | | |
|---|---|---|---|
| 7,774,455 B1 * | 8/2010 | Tock | G06F 21/33 709/224 |
| 7,853,783 B2 | 12/2010 | Bin et al. | |
| 8,341,278 B2 | 12/2012 | Tewari et al. | |
| 8,543,828 B2 * | 9/2013 | Albisu | G06F 21/35 705/72 |
| 9,178,877 B1 * | 11/2015 | Koneru | H04L 63/0846 |
| 2001/0056409 A1 * | 12/2001 | Bellovin | G06Q 20/04 705/64 |
| 2004/0259633 A1 * | 12/2004 | Gentles | G07F 17/32 463/29 |
| 2006/0069914 A1 | 3/2006 | Rupp et al. | |
| 2007/0250923 A1 * | 10/2007 | M'Raihi | G06F 21/34 726/18 |
| 2007/0266246 A1 | 11/2007 | Lee et al. | |
| 2014/0035721 A1 * | 2/2014 | Heppe | G07C 9/00571 340/5.54 |
| 2014/0115341 A1 * | 4/2014 | Robertson | H04L 9/3228 713/183 |

OTHER PUBLICATIONS

Written Opinion dated Jul. 5, 2013 corresponding to International Patent Application No. PCT/US2013/033524; 4 pages.

* cited by examiner

US 9,497,188 B2

OFFLINE AUTHENTICATION WITH EMBEDDED AUTHORIZATION ATTRIBUTES

CLAIM OF PRIORITY

This application is a 371 of International Application No. PCT/US13/33524, filed Mar. 22, 2013 which claims the benefit of U.S. Provisional Patent Application No. 61/614,651, filed Mar. 23, 2014. The disclosures of these documents are hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to computer-based systems and methods for the prevention of unauthorized access to information system resources, and in particular to the creation of stand-alone credentials for authentication and authorization.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

A node is a secure, networked device that gathers and distributes information about power grid components, such as transformers on pole-tops or concrete pads, on or near to which the node is mounted. A technician, an employee of the utility operating the power grid, may need to log in to the node locally while on a service call. When the node can connect to a network authentication server in a network operations center, it will forward local login requests to the network authentication server. However, when the node is offline, it will not be able to communicate with the network authentication server. There is a need for an offline authentication mechanism for a node as a backup to the network authentication server when the node is offline.

A common offline authentication mechanism is a local password file. The vulnerability of a local password file can be reduced by encrypting it, but even then the vulnerability is greater than the vulnerabilities of many other authentication mechanisms. Once an attacker gains physical access to a device that is secured using a local password file, it is only going to be a matter of time until the attacker is able read the local password file using a brute-force attack. The exposed location of a node makes the use of a local password file in the node particularly vulnerable. There is a need for an offline authentication mechanism for a node that is less vulnerable than using a local password file on the node.

One-time passwords are often used as the solution in similar situations; however, the inability to use a one-time password more than once would be inconvenient when a technician is on a service call to a node. The technician may need to log in to the node more than once during the service call. A reusable password will solve this problem, but will also introduce vulnerabilities of other types, including dictionary attacks, social engineering, theft, and accidental disclosure. Physical tokens have similar vulnerabilities and can be difficult for a technician to operate during a service call.

There is a need for an offline authentication mechanism for a node that allows repeated logins during a service call but is not as vulnerable as a reusable password or a physical token.

SUMMARY OF INVENTION

An offline authentication mechanism for a node includes an offline password generator of a reusable password having a limited lifespan. The offline password generator is located in a network operations center and can provide both authentication and authorization services. A shared secret, i.e., a secret item of data that is shared by both of the offline password generator and the node, is stored in encrypted form on the node, but the shared secret by itself cannot be used to login to the node. This is because the offline password generator generates a password that is based not only on the shared secret, but also on other items of data. Several methods for implementing limited lifespans are disclosed, including (i) use of the date of intended access, and (ii) use of a specified start time with a fixed duration.

There is provided a method implemented by a first device that includes (a) including in a dataset, data indicative of a time, (b) executing a hash function on the dataset to yield a hash value, and (c) employing the hash value as a password for a user to access a device. There is also provided a method implemented by a second device that includes (a) including in a dataset, data indicative of a time, (b) executing a hash function on the dataset to yield a hash value, (c) determining that the hash value matches a password from a user, and (d) granting to the user access to the second device. There are also provided systems that perform the methods and storage devices that contain instructions for causing processors to perform the methods.

DESCRIPTION OF THE INVENTION

An offline authentication mechanism for a node includes an offline password generator of a reusable password having a limited lifespan. A shared secret is stored on the node, but an attacker cannot use the shared secret by itself to log in to the node. This is because the offline password generator generates a password that is based not only on the shared secret, but also on other items of data. In different embodiments, the shared secret is stored on the node using various hash or encryption algorithms for additional protection.

The offline password generator and the node may both generate passwords using the key derivation function PBKDF2 (password-based key derivation function two). PBKDF2 iteratively applies a selected pseudorandom function, such as MD5 (message digest five), SHA-2 (secure hash algorithm two), SHA-256, or HMAC-MD5 (hash-based message authentication code using MD5), HMAC-SHA-2, or HMAC-SHA-256, on the desired input values.

Note that hashing is different from encryption. Data is encrypted to yield a cipher value in such a way that the cipher value can be subsequently decrypted to yield the original data. Thus, encryption is a reversible operation, with decryption as a complementary operation. In contrast, data is hashed to yield a hash value that represents the data, but ordinarily the original data cannot be recovered from the hash value. Hashing is a non-reversible, or one-way, operation with no complementary operation. However, in the system described herein, a hash value is processed in such a way that the original data, or at least a portion thereof, is deduced.

Figure 1:
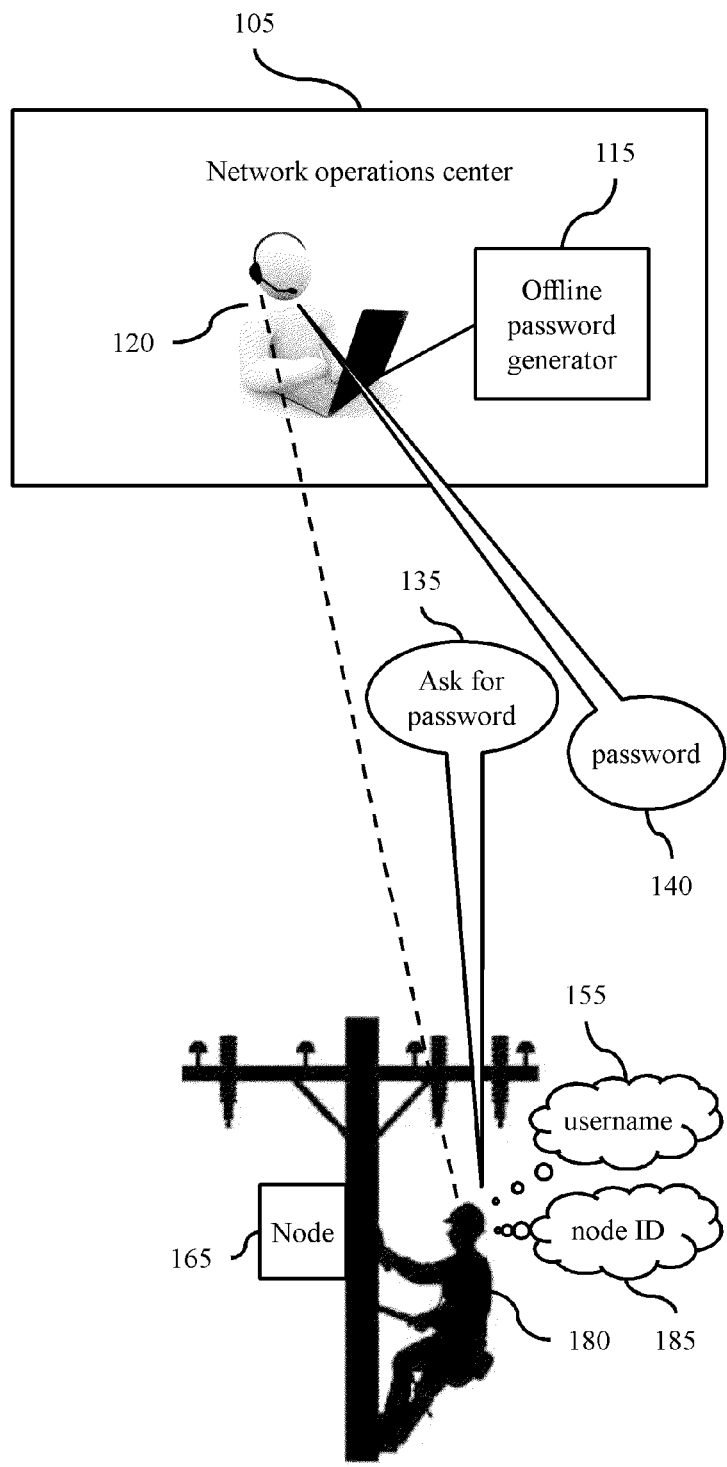
FIG. 1 is a drawing illustrating an offline authentication mechanism to log in locally to a node.

FIG. 1 is a drawing illustrating an exemplary use of an offline authentication mechanism to log in locally to a node. A network operations center (NOC) 105 is a facility that includes an offline password generator 115. A NOC operator 120 works in NOC 105 and has physical access to offline password generator 115.

A technician 180 is on a service call that includes a node 165, technician 180, using, for example, a cellular telephone (not shown), verbally conveys to NOC operator 120, a password request 135 that includes a username 155 that identifies technician 180, and a node identifier 185 that identifies node 165. NOC operator 120 operates offline password generator 115 to produce a password 140, and verbally conveys password 140 to technician 180. In another embodiment, technician 180 obtains password 140 from NOC operator 120 in person (e.g., on a written work order).

Data that is used to generate password 140 indicates a level of authorization, i.e., a level of access, to which technician 180 is entitled when accessing node 165. As used herein, the term "authentication" may refer to both an authentication function, i.e., granting or denying access, and an authorization function, i.e., authorizing a level of access. For example, (i) authorization level 1 may authorize technician 180 to only read data from node 165, (ii) authorization level 2 may allow technician 180 to perform minor maintenance (e.g., reset history) on node 165, and (iii) authorization level 3 may allow technician 180 to reconfigure node 165 (e.g., change an address of a network management server with which node 165 will communicate). However, in another embodiment, password 140 does not include authorization data, but only directs node 165 to grant access to technician 180.

After receipt of password 140, technician 180 enters username 155 and password 140 on node 165, and node 165 performs authentication and authorization locally. If node 165 grants access to technician 180, then technician 180 is logged in to node 165 with an authorization level specified by password 140.

Figure 2:
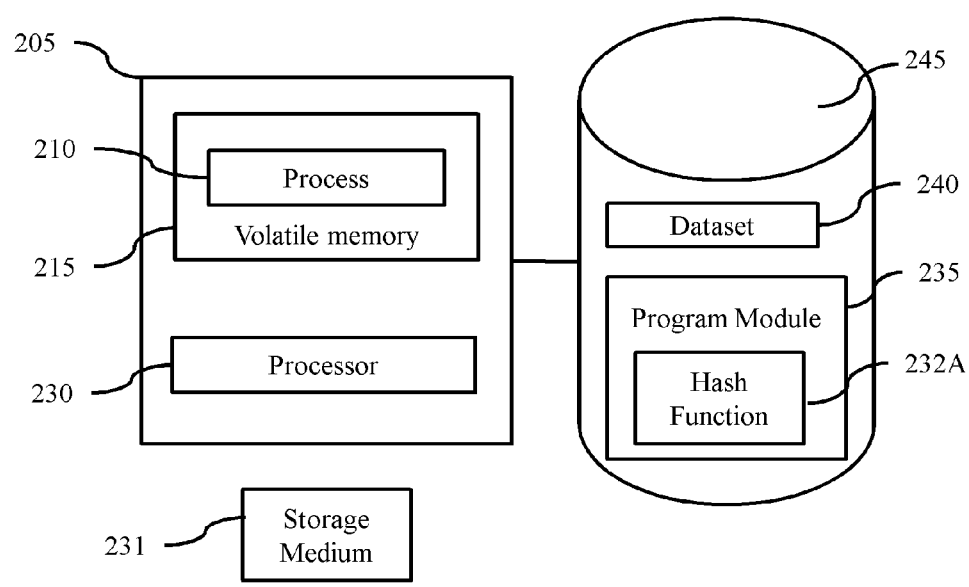
FIG. 2 is a block diagram of an architecture for an offline password generator.

FIG. 2 is a block diagram of an exemplary architecture for offline password generator 115, which includes a computing device 205 and a storage device 245.

Storage device 245 is a tangible computer-readable storage medium, and may be implemented, for example, in a hard drive, a read only memory (ROM), or a combination thereof. Storage device 245 contains a dataset 240 and a program module 235. Dataset 240 is a collection of data, the significance of which is described further below. Program module 235 contains a set of instructions for controlling a processor, and may be implemented as a single module or as a plurality of modules that operate in cooperation with one another. The term "module" is used herein to denote a functional operation that may be embodied either as a stand-alone component or as an integrated configuration of a plurality of subordinate components. Moreover, although program module 235 is described herein as being installed in storage device 245, and therefore being implemented in software, it could be implemented in any of hardware, e.g., electronic circuitry, firmware, software, or a combination thereof. One of the components of program module 235 is a hash function 232A. Hash function 232A is a function that maps a first data set, called a key, into a second data set, called a hash value.

Computing device 205 includes a processor 230, and a volatile memory 215. Processor 230 is an electronic device configured of logic circuitry that responds to and executes instructions. Volatile memory 215 stores data and instructions that are readable and executable by processor 230 for controlling the operation of processor 230. Volatile memory 215 may be implemented, for example, in a random access memory (RAM). Processor 230 reads program module 235 and dataset 240 from storage device 245, and executes program module 235 as a process 210 in volatile memory 215.

While program module 235 is indicated as already loaded into storage device 245, it may be configured on a storage device 231 for subsequent loading into storage device 245 or volatile memory 215. Storage device 231 is a tangible computer-readable storage medium that stores program module 235 thereon. Examples of storage device 231 include a compact disk, a magnetic tape, a read only memory, an optical storage media, a hard drive or a memory unit consisting of multiple parallel hard drives, and a universal serial bus (USB) flash drive.

Figure 3:
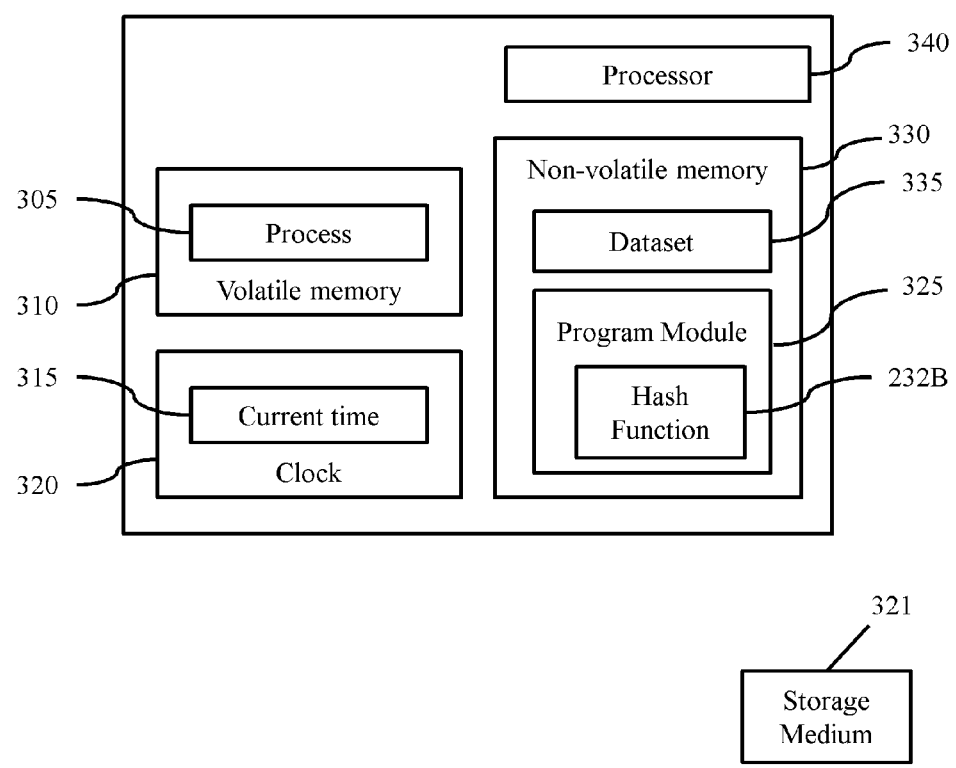
FIG. 3 is a block diagram of an architecture for a node.

FIG. 3 is a block diagram of an exemplary architecture for node 165 that includes a processor 340, a volatile memory 310, a clock 320, and a non-volatile memory 330.

Clock 320 keeps time (e.g., years, months, days, hours, minutes, seconds, etc.), and when read, provides a current time 315. As used herein, the term "time" may refer to both date and time of day. The significance of clock 320 and current time 315 is described further below.

Non-volatile memory 330 is a tangible computer-readable storage medium, and may be implemented, for example, in a hard drive, a read only memory (ROM), or a combination thereof. Non-volatile memory 330 contains a dataset 335 and a program module 325. Dataset 335 is a collection of data, the significance of which is described further below. Program module 325 contains a set of instructions for controlling processor 340, and may be implemented as a single module or as a plurality of modules that operate in cooperation with one another. Although program module 325 is described herein as being installed in non-volatile memory 330, and therefore being implemented in software, it could be implemented in any of hardware, e.g., electronic circuitry, firmware, software, or a combination thereof. One of the components of program module 325 is a hash function 232B.

Hash function 232B is a functional equivalent of hash function 232A. That is, hash function 232B and hash function 232A are the same hash function. Accordingly, each of hash function 232A and 232B, when presented with the same input data set, will produce the same resultant hash value.

Processor 340 is an electronic device configured of logic circuitry that responds to and executes instructions. Volatile memory 310 stores data and instructions that are readable and executable by processor 340 for controlling the operation of processor 340. Volatile memory 310 may be implemented, for example, in a random access memory (RAM). Processor 340 reads program module 325 and dataset 335 from non-volatile memory 330, and executes program module 325 as a process 305 in volatile memory 310.

While program module 325 is indicated as already loaded into non-volatile memory 330, it may be configured on a storage device 321 for subsequent loading into non-volatile memory 330 or volatile memory 310. Storage device 321 is a tangible computer-readable storage medium that stores program module 325 thereon. Examples of storage device 321 include a compact disk, a magnetic tape, a read only memory, an optical storage media, a hard drive or a memory unit consisting of multiple parallel hard drives, and a universal serial bus (USB) flash drive.

Figure 4:
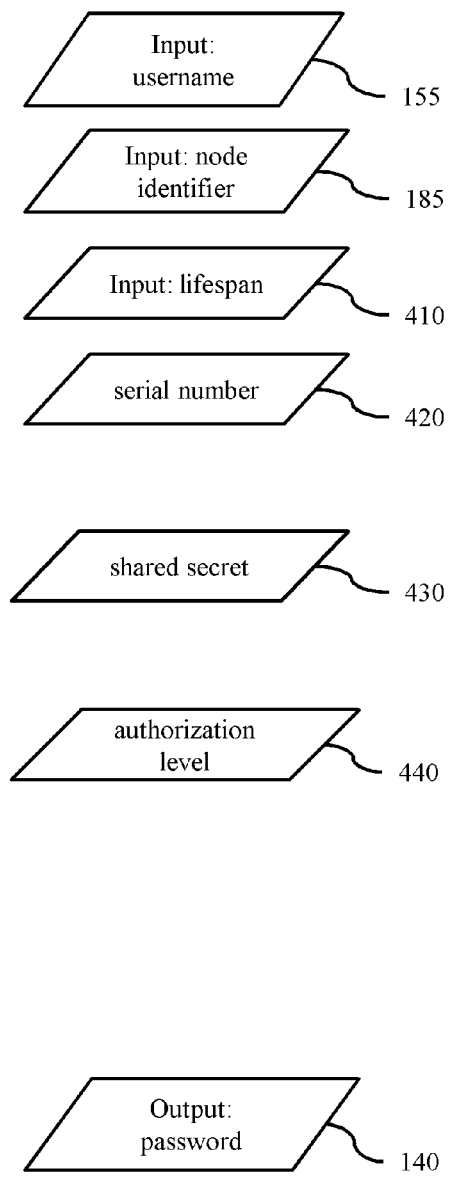
FIG. 4 is a flowchart for a method implemented by an offline password generator to process a request to generate a password.
Figure 4:
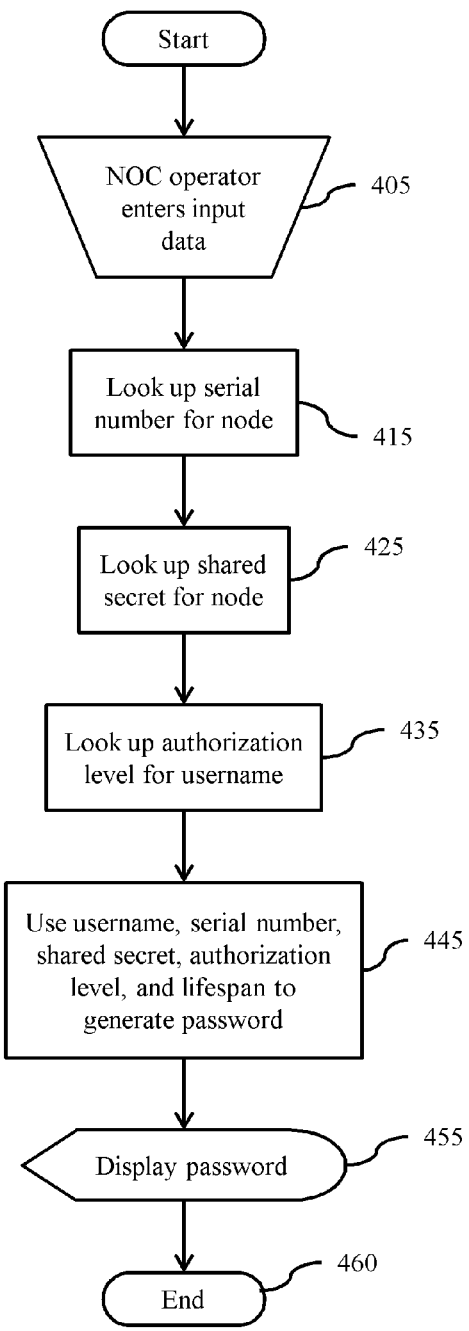

FIG. 4 is a flowchart for an exemplary method 400 implemented by offline password generator 115, and in particular by processor 230, to process a request to generate password 140. Method 400 is encoded as a program component of program module 235.

Prior to commencement of method 400, technician 180 requests a password from NOC operator 120. As part of the request, technician 180 provides NOC operator 120 with username 155 and node identifier 185.

Method 400 commences with step 405.

In step 405, from NOC operator 120, processor 230 receives username 155, node identifier 185, and a lifespan 410. Lifespan 410 specifies a time window for use of password 140 to be enforced by node 165. The manner in which lifespan 410 is employed to generate password 140 may depend, in part, on the manner in which password 140 is processed by node 165. In one example, lifespan 410 specifies a date, alone, e.g., Mar. 23, 2012, and as such, password 140 will be valid for accessing node 165 only on that date. In another example, lifespan 410 specifies a date and a start time, e.g., Mar. 23, 2012, 12:00 PM, where and as such, password 140 will be valid for accessing node 165 only on that date, starting at that start time, for a predetermined duration of time that is known in advance, by both offline generator 115 and node 165. Implementation details of processing password 140 by node 165, for each of these two examples of lifespan 410, are presented below, in association with FIGS. 6 and 7.

From step 405, method 400 progresses to step 415.

In step 415, processor 230 looks up a serial number 420 in dataset 240 for node identifier 185. From step 415, method 400 progresses to step 425.

In step 425, processor 230 looks up a shared secret 430 in dataset 240 for node identifier 185. Shared secret 430 is a secret item of data that is also known by node 165. From step 425, method 400 progresses to step 435.

In step 435, processor 230 looks up an authorization level 440 in dataset 240 for username 155. From step 435, method 400 progresses to step 445.

In step 445, processor 230 uses username 155, serial number 420, shared secret 430, authorization level 440, and lifespan 410 to generate password 140 in accordance with hash function 232A. That, password 140 is a hash value generated from a data set of username 155, serial number 420, shared secret 430, authorization level 440, and lifespan 410.

Recall that username 155 identifies technician 180, serial number 420 is the serial number of node 165, and shared secret 430 is a secret item of data that is also know by node 165. Thus, password 140 is suitable only for use by technician 180, with node 165, during a time window specified by lifespan 410.

A possible example of password 140 is: 5gFT-2a7z-BEyY-rdu2.

From step 445, method 400 progresses to step 455.

In step 455, processor 230 provides password 140 to NOC operator 120, for example, by way of a display (not shown). From step 455, method 400 progresses to step 460.

In step 460, method 400 ends.

Figure 5:
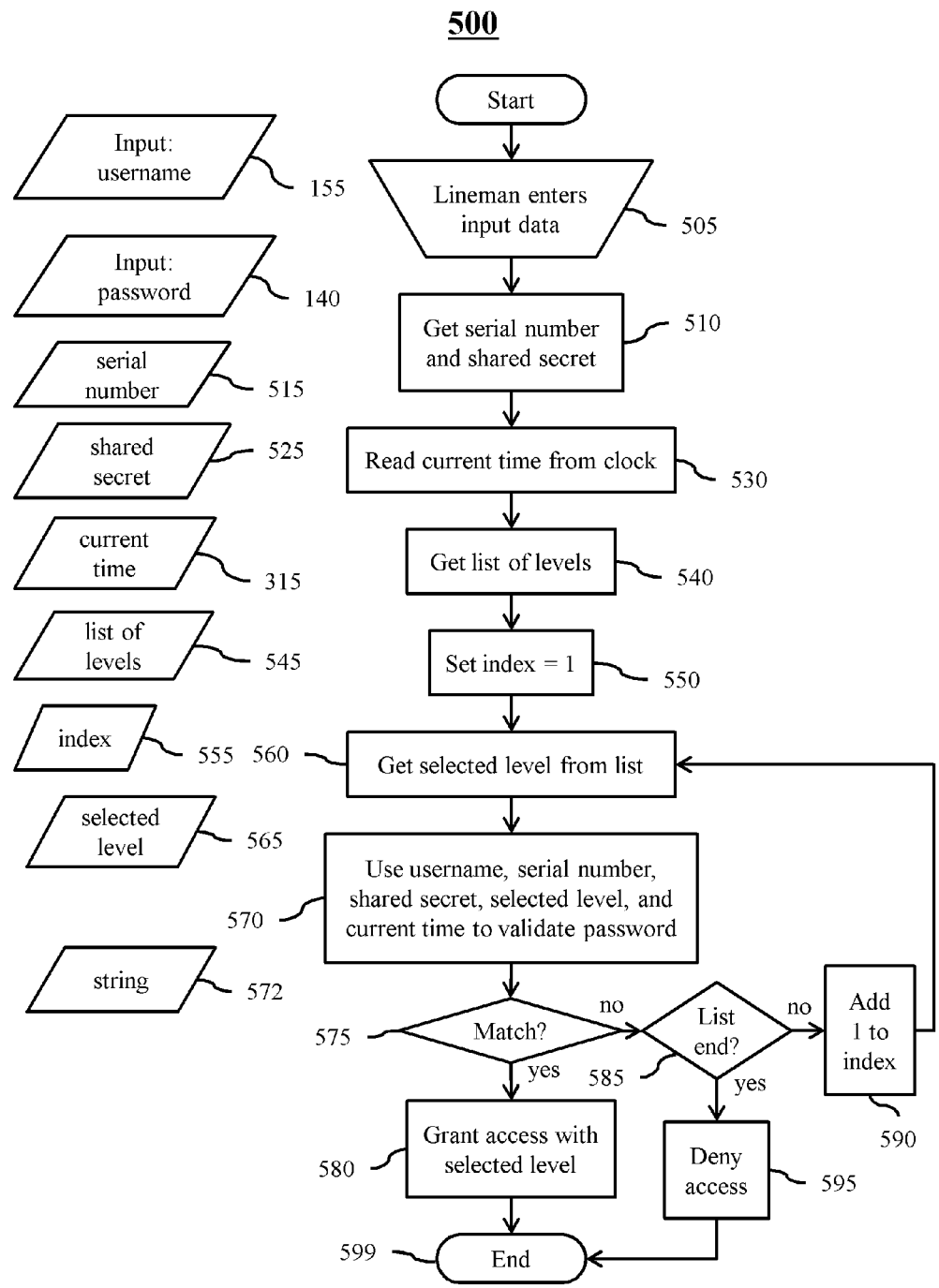
FIG. 5 is a flowchart for a method implemented by a node to process a login request using a password generated by an offline password generator.

FIG. 5 is a flowchart for an exemplary method 500 implemented by node 165, and in particular by processor 340, to process a login request using password 140. Method 500 is encoded as a program component of program module 325.

Recall that method 400 provides password 140 to NOC operator 120. Prior to the commencement of method 500, NOC operator 120 provides password 140 to technician 180. Also recall that password 140 is suitable only for use by technician 180, with node 165, during a time window specified by lifespan 410.

Method 500 commences with step 505.

In step 505, from technician 180, processor 340 receives username 155 and password 140. From step 505, method 500 progresses to step 510.

In step 510, processor 340 gets a serial number 515 and a shared secret 525 from dataset 335. Serial number 515 is the serial number of node 165. Shared secret 525 is a secret item of data that is also known by offline password generator 115. To provide a further level of security, shared secret 525 is stored in node 165 in encrypted format. Processor 340, in step 510, decrypts shared secret 525, and subsequent to step 510, utilizes the decrypted version of shared secret 525. From step 510, method 500 progresses to step 530.

In step 530, processor 340 reads current time 315 from clock 320. From step 530, method 500 progresses to step 540.

In step 540, processor 340 gets a list of authorization levels 545 from dataset 335. For example, assume that list of authorization levels 545 lists three authorization levels, namely authorization level 1, authorization level 2, and authorization level 3. From step 540, method 500 progresses to step 550.

In step 550, processor 340 sets an index 555 equal to 1. Index 555 will be used below, in step 560, as an index to list of authorization levels 545. From step 550, method 500 progresses to step 560.

In step 560, processor 340, using index 555, gets a selected authorization level 565 from list of authorization levels 545. From step 560, method 500 progresses to step 570.

In step 570, processor 340 uses username 155, serial number 515, shared secret 525, selected authorization level 565, and current time 315 to (i) generate a string 572, in accordance with hash function 232B, and (ii) determine whether string 572 matches password 140, i.e., whether string 572 and password 140 are identical to one another.

Recall that hash function 232B is a functional equivalent of hash function 232A, and that each of hash function 232A and 232B, when presented with the same input data set, will produce the same resultant hash value. Therefore, if the hash value from hash function 232B, i.e., string 572, is the same as password 140, then password 140 will be regarded as valid.

As mentioned above, in method 400, the manner in which lifespan 410 is employed to generate password 140 may depend, in part, on the manner in which password 140 is processed by node 165. Implementation details of step 570 for two examples are described below in association with FIGS. 6 and 7.

From step 570, method 500 progresses to step 575.

In step 575, processor 340 checks whether string 572 matches password 140. If string 572 matches password 140, then password 140 is deemed to be valid, and method 500 progresses from step 575 to step 580. If string 572 does not match password 140, then method 500 progresses from step 575 to step 585.

Note that in step 575, a match between string 572 and password 140 means that the selected authorization level 565 that was used in step 570 to generate string 572 is the same as authorization level 440 as specified in step 435 of method 400, and is also the authorization level to which lineman 180 is entitled. Thus, method 500 has effectively deduced authorization level 440 from password 140, without actually decrypting password 140.

Note that in step 575, a lack of a match between string 572 and password 140 may mean, but does not necessarily mean, that password 140 is invalid. Instead, the lack of a match may merely mean that the selected authorization level 565 that was used to generate string 572 is not the same as the authorization level 440 that was used to generate password 140. Accordingly, in the case where string 572 does not match password 140, method 500 progresses to step 585 to consider a different authorization level.

In step 580, processor 340 grants technician 180 access to node 165 with selected authorization level 565. From step 580, method 500 progresses to step 599.

In step 585, processor 340 determines whether method 500 has reached the end of list of authorization levels 545. If selected authorization level 565 is not the last authorization level in list of authorization levels 545, i.e., if method 500 has not yet reached the end of list of authorization levels 545, then method 500 progresses from step 585 to step 590. If selected authorization level 565 is the last authorization level in list of authorization levels 545, i.e., if method 500 has reached the end of list of authorization levels 545, then method 500 progresses from step 585 to step 595.

In step 590, processor 340 adds 1 to index 555. Thus, index 555 will serve as an index to the next authorization level in list of authorization levels 545. From step 590, method 500 loops back to step 560.

In step 595, processor 340 denies technician 180 access to node 165. From step 595, method 500 progresses to step 599.

In step 599, method 500 ends.

The implementation details of step 445 and of step 570 for several different embodiments, with regard to how time is used to encode password 140 and to validate password 140, respectively, are described below, in association with FIGS. 6 and 7. These descriptions are meant to be exemplary, and not exhaustive, of all possible embodiments of this technique.

Figure 6:
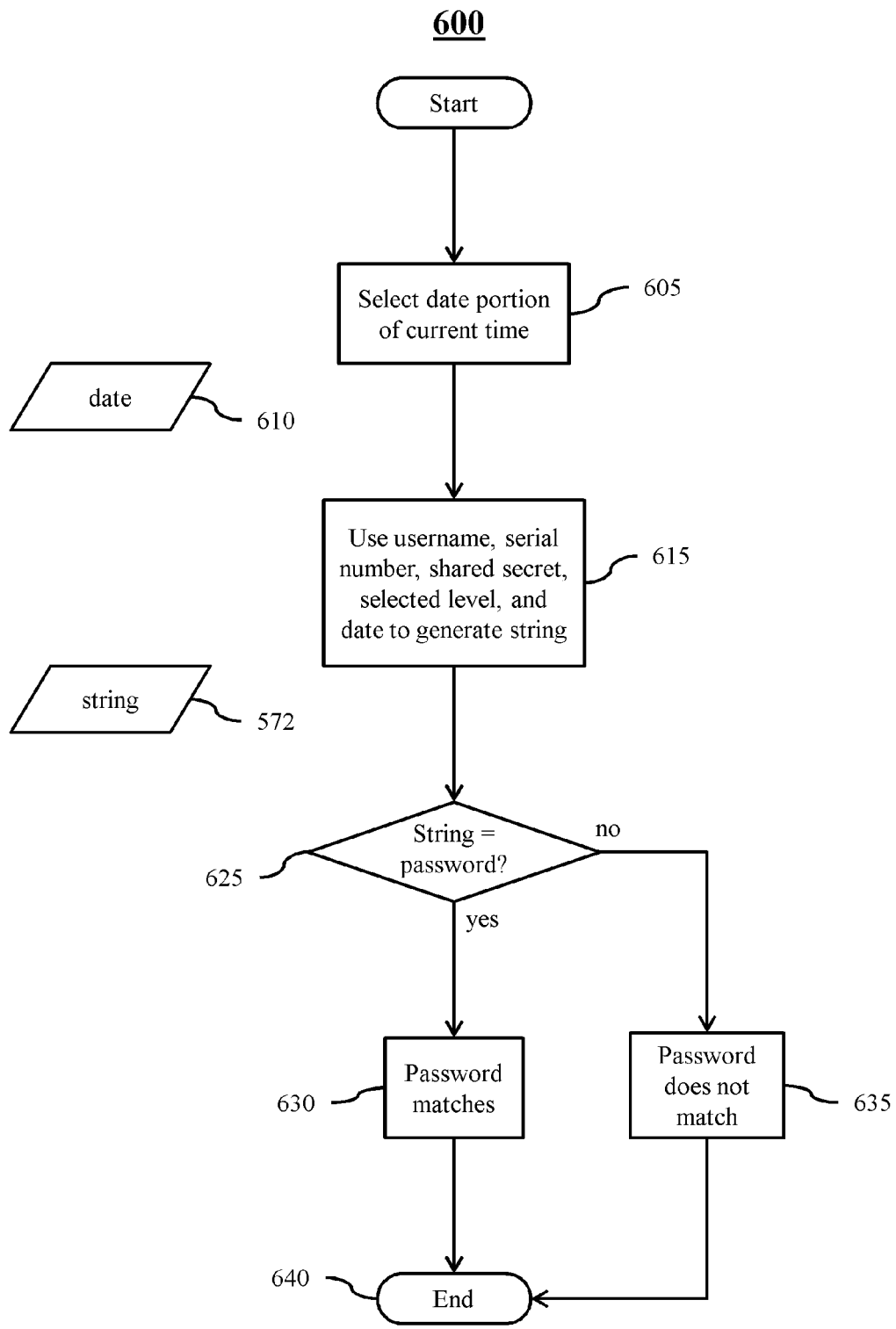
FIG. 6 is a flowchart for a method implemented by a node to execute a password validation in an embodiment where a lifespan of the password is the extent of the date of intended access.

FIG. 6 is a flowchart for an exemplary method 600 implemented by node 165, and in particular by processor 340, to execute step 570 in an embodiment where lifespan 410 indicates a date, but no particular time on that date, during which password 140 should be valid. That is, when method 400 was run, NOC operator 120 specified a lifespan 410 that indicated a particular date, and password 140 was generated from a dataset that included that particular date. Method 600 is encoded as a program component of program module 325.

Method 600 commences with step 605.

In step 605, processor 340 obtains a date 610 from current time 315. From step 605, method 600 progresses to step 615.

In step 615, processor 340 uses username 155, serial number 515, shared secret 525, i.e., the decrypted version of shared secret 525 (see step 510), selected authorization level 565, and date 610 to generate string 572. From step 615, process 600 progresses to step 625.

In step 625, processor 340 determines whether string 572 matches password 140. As mentioned above, hash function 232B is a functional equivalent of hash function 232A, and each of hash function 232A and 232B, when presented with the same input data set, will produce the same resultant hash value. Therefore, if the hash value from hash function 232B, i.e., string 572, is the same as password 140, then password 140 will be regarded as valid. If string 572 matches password 140, then method 600 progresses to step 630. If string 572 does not match password 140, then method 600 progresses to step 635.

Note that in step 625, a match between string 572 and password 140 means that the date 610 that was used in step 615 to generate string 572 is the same as the date in lifespan 410 as specified in step 405 of method 400. Thus, method 600 has effectively deduced the date in lifespan 410 from password 140, without actually decrypting password 140.

In step 630, processor 340 indicates that string 572 matches password 140. From step 630, method 600 progresses to step 640.

In step 635, processor 340 indicates that string 572 does not match password 140. From step 635, method 600 progresses to step 640.

In step 640, method 600 ends.

Figure 7:
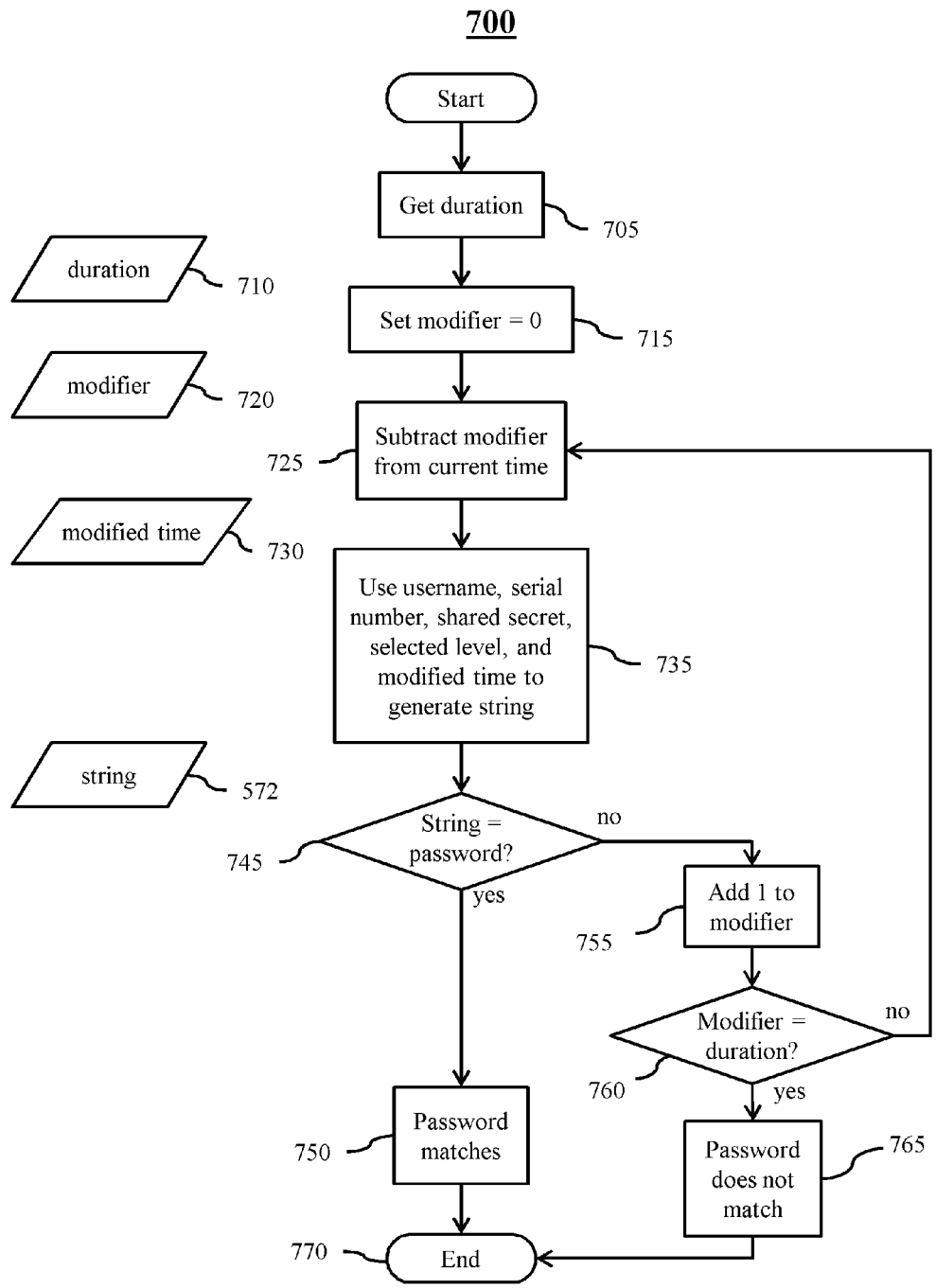
FIG. 7 is a flowchart for a method implemented by a node to execute a password validation in an embodiment where the lifespan of the password has a fixed duration.

FIG. 7 is a flowchart for an exemplary method 700 implemented by node 165, and in particular by processor 340, to execute step 570 in an embodiment where lifespan 410 has a fixed duration (e.g., 3 hours), known in advance by both offline password generator 115 and node 165, and a date and start time entered by NOC operator 120 in step 405 of method 400. In method 700, the fixed duration is specified by duration 710, which resides in dataset 335. Method 700 is encoded as a program component of program module 325.

Method 700 commences with step 705.

In step 705, processor 340 gets duration 710 (e.g., 3 hours) from dataset 335. From step 705, method 700 progresses to step 715.

In step 715, processor 340 sets a time modifier 720 to zero. Time modifier 720 will be used by processor 340 in subsequent steps, in a determination of whether lineman 180 is using password 140 during a permitted window of time. More specifically, time modifier 720 will be used to modify a value of time that is being used to consider whether password 140 is being used during a permissible window of time that starts at the time entered by NOC operator 120 in step 405 of method 400, and runs for a predetermined duration thereafter. Modifier 720 therefore has a level of resolution, e.g., one hour, that is the same as the level of resolution to for which method 700 will evaluate time. From step 715, method 700 progresses to step 725.

In step 725, processor 340 subtracts time modifier 720 from current time 315 to create a modified time 730. Modified time 730 has a precision, for example, in hours, and conceptually will be compared to the start time entered by NOC operator 120 in step 405 of method 400. Here we say that the comparison is conceptual because the comparison will not be a literal comparison of the start times, but instead, a comparison of hash values, in the form of string 572 and password 140, that were generated from datasets that included start times. From step 725, method 700 progresses to step 735.

In step 735, processor 340 uses username 155, serial number 515, shared secret 525, i.e., the decrypted version of shared secret 525 (see step 510), selected authorization level 565, and modified time 730 to generate string 572. From step 735, method 700 progresses to step 745.

In step 745, processor 340 determines whether string 572 matches password 140. As mentioned above, hash function 232B is a functional equivalent of hash function 232A, and each of hash function 232A and 232B, when presented with the same input data set, will produce the same resultant hash value. Therefore, if the hash value from hash function 232B, i.e., string 572, is the same as password 140, then password 140 will be regarded as valid. If string 572 matches password 140, then method 700 progresses from step 745 to step 750. If string 572 does not match password 140, then method 700 progresses from step 745 to step 755.

Note that in step 745, a lack of a match between string 572 and password 140 may mean, but does not necessarily mean, that password 140 is invalid. Instead, the lack of a match may merely mean that the value of modified time 730 that was used to generate string 572 in step 735 is not the same as the value was used to generate password 140. Accordingly, in the case where string 572 does not match password 140, method 700 progresses to step 755 to consider a different modified time 730.

Note also that in step 745, a match between string 572 and password 140 means that modified time 730 that was used in step 735 to generate string 572 is the same as the start time in lifespan 410 as specified in step 405 of method 400. Thus, method 700 has effectively deduced the start time in lifespan 410 from password 140, without actually decrypting password 140.

In step 750, processor 340 indicates that password 140 is valid. From step 750, method 700 progresses to step 770.

In step 755, processor 340 adds 1 to time modifier 720. From step 755, method 700 progresses to step 760.

In step 760, processor 340 determines whether time modifier 720 is equal to duration 710. If time modifier 720 is not equal to duration 710, then processor 340 has not yet considered the full window of time for which a password can be valid, and as such, other variations of string 572 should be generated. If time modifier 720 is equal to duration 710, then processor 340 has considered the full window of time for which a password can be valid, and as such, since string 572 has not matched password 140, password 140 must be invalid. If time modifier 720 is not equal to duration 710, then method 700 loops back to step 725. If time modifier 720 is equal to duration 710 then method 700 progresses from step 755 to step 765.

In step 765, processor 340 indicates that password 140 is not valid. From step 765, method 700 progresses to step 770.

In step 770, method 700 ends.

To better understand the individual steps of method 700, consider its general operation. Assume that duration 710 is 3 hours, and that in step 405, NOC operator 120 specified a start time of 1:00 PM, i.e., 13:00 on a 24-hour clock. As such, password 140 is intended to be valid only during the time window of 13:00-16:00. So, the question is, "Is the current time within the window of 13:00-16:00?" However, prior to validation of password 140, node 165 does not know that the start time is 13:00, and so, cannot formulate and answer this question. Nevertheless, since password 140 is generated from a dataset that includes the start time, i.e., 13:00, in order for string 572 to match password 140, string 572 would need to be generated from a string that includes the same start time, i.e., 13:00. Accordingly, method 700 strives to generate such a string by first generating string 572 from a dataset that includes the current time, and determining whether that version of string 572 matches password 140. If there is not a match, then method 700 generates a version of string 572 from a dataset that includes an earlier time, e.g., one hour earlier. This process continues until method 700 either finds a match (thus concluding that password 140 is valid), or considers a full window of time equal to the current time minus the time in duration 7110.

Example: Successful Login Process at 14:10
(i) current time=14:00 (truncate minutes and seconds from real time);
(ii) first time through loop: hypothesize 14:00 as start time (modifier=0); fails:
(iii) second time through loop: hypothesize 13:00 as start time (modifier=1); succeeds (assuming everything else is correct).

Example: Unsuccessful Login Process at 12:37
(i) current time=12:00 (truncate minutes and seconds from real time);
(ii) first time through loop: hypothesize 12:00 as start time (modifier=0); fails;
(iii) second time through loop: hypothesize 11:00 as start time (modifier=1); fails;
(iv) third time through loop: hypothesize 10:00 as start time (modifier=2); fails;
Login rejected.

Example: Unsuccessful Login Process at 16:05
(i) current time=16:00 (truncate minutes and seconds from real time);
(ii) first time through loop: hypothesize 16:00 as start time (modifier=0); fails;
(iii) second time through loop: hypothesize 15:00 as start time (modifier=1); fails;
(iv) third time through loop: hypothesize 14:00 as start time (modifier=2); fails;
Login rejected.

In summary, offline password generator 115 (*a*) generates password 140 using parameters that include (i) a shared secret stored in encrypted form on offline password generator 115, (ii) multiple parameters stored in unencrypted form on offline password generator 115, and (i) multiple parameters (that include a username) provided as input to offline password generator 115 by a user of offline password generator 115, and (b) provides the password as output to the user of offline password generator 115.

Thereafter, node 165 (*a*) accepts password 140 as an input, (b) generates string 572 using parameters that include (i) a shared secret stored in encrypted form on node 165, (ii) multiple parameters stored in unencrypted form on node 165, and (iii) a username provided as input to node 165 by a user of node 165, and (c) allows the user of node 165 to login to node 165 if string matches 572 password 140.

Thus, the operations of offline password generator 15 and node 165 provide authenticated access to node 165, although node 165 does not have locally stored passwords, using password 140 generated by offline password generator 115.

Offline password generator 115 and node 165, working together, convey authorization attributes from offline password generator 115 to node 165 in password 140, by having offline password generator 115 use the attributes as inputs to a hash function that generates password 140, and having node 165 deduce the attributes as part of a password evaluation process. A first subtype of attribute is a binary authorization attribute that either matches or doesn't. For example, username and node identifier. A second subtype of attribute is an ordinal authorization attribute that node 165 must deduce by iterating over the possible ordinal values as node 165 generates comparison strings. For example, access level, i.e., authorization level, and time window. Note that the first subtype is a special case of the second subtype using one iteration.

Thus, offline password generator 115 and node 165 leverage the conveyance of authorization attributes in password 140 to increase the complexity of the hash function inputs, thus making the password mechanism more difficult to crack.

A benefit of the use of offline password generator 115 and node 165 is that password 140 is valid only during a specific lifespan, only for a specific user and authorization level, and only on a specific node, i.e., node 165. Another benefit is that password 140 is reusable during the specified lifespan, without the need for a physical token. A further benefit is that password 140 can be generated at a moment of need, and conveyed to lineman 180 verbally over the phone, without the need for network access by node 165, or pre-generation of password 140.

Although the techniques described herein are presented as being used for access to node 165, the techniques can be employed for access to any type of device having a processing capability similar to that of processor 340. For example, the techniques may be used to control access to a general purpose computer, a website, a motor vehicle, or a vault.

Additionally, although the techniques described herein are presented in the context of node 165 being "offline", i.e., not being connected to a data network, the techniques can also be employed in a case where node 165, or any suitable processing device, is "online", i.e., connected to a data network.

Furthermore, although the techniques described herein are presented as being used to define password 140 as being valid for some particular period of time, other parameters could used in addition to, or instead of, time. For example, password 140 could be configured to be valid for only a specified location based on longitude and latitude. In such a case, password 140 would be generated from a dataset that includes the longitude and latitude, and node 165 would generate versions of string 572 with latitudes and longitudes. Node 165 could be in a fixed location, in which case its latitude and longitude could be included in dataset 335, or it could be mobile, e.g., in a motor vehicle, with global positioning satellite (GPS) capability.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method in a node, the method comprising:
   including, by the node, in a dataset, data indicative of at least a time, a username, and a list of authorization levels;
   obtaining, by the node, from the dataset the list of authorization levels;
   setting, by the node, an index to equal "1", where the index serves as an index to the list of authorization levels;
   getting, by the node, a selected authorization level from the list of authorization levels;
   executing, by the node, a hash function on at least the time, the username, and the selected authorization level to yield a hash value;
   determining, by the node whether said hash value matches or does not match a password from a user associated with the username;
   based on the determination that said hash value does match the password from the user, granting said user access to the node;
   based on the determination that said hash value does not match the password from the user, determining, by the node, whether or not reached an end of the list of authorization levels;
      based on the determination that reached the end of the list of authorization levels, denying said user access to the node; and,
      based on the determination that did not reach the end of the list of authorization levels, adding "1" to the index and repeating the getting step, the executing step, the first determining step and when applicable at least one of the granting step, the second determining step, and the denying step using another selected authorization level that corresponds to the current index.

2. The method of claim 1, wherein said time includes a current date.

3. The method of claim 1, wherein said time includes a current time of day.

4. A node comprising:
   a processor; and
   a memory that contains instructions that are readable by said processor to cause said processor to:
      include in a dataset, data indicative of at least a time, a username, and a list of authorization levels;
      obtain from the dataset the list of authorization levels;
      set an index to equal "1", where the index serves as an index to the list of authorization levels;
      get a selected authorization level from the list of authorization levels;
      execute a hash function on at least the time, the username, and the selected authorization level to yield a hash value;
      determine whether said hash value matches or does not match a password from a user associated with the username;
      based on the determination that said hash value does match the password from the user, grant said user access to the node;
      based on the determination that said hash value does not match the password from the user, determine whether or not reached an end of the list of authorization levels;

based on the determination that reached the end of the list of authorization levels, deny said user access to the node; and, based on the determination that did not reach the end of the list of authorization levels, adding "1" to the index and repeating the getting operation, the executing operation, the first determining operation and when applicable at least one of the granting operation, the second determining operation, and the denying operation using another selected authorization level that corresponds to the current index.

5. The system of claim 4, wherein said time includes a current date.

6. The system of claim 4, wherein said time includes a current time of day.

7. A storage device comprising instructions that are readable by a processor to cause said processor to:
include in a dataset, data indicative of at least a time, a username, and a list of authorization levels;
obtain from the dataset the list of authorization levels;
set an index to equal "1", where the index serves as an index to the list of authorization levels;
get a selected authorization level from the list of authorization levels;
execute a hash function on at least the time, the username, and the selected authorization level to yield a hash value;

determine whether said hash value matches or does not match a password from a user associated with the username;

based on the determination that said hash value does match the password from the user, grant said user access to the node;

based on the determination that said hash value does not match the password from the user, determine whether or not reached an end of the list of authorization levels:

based on the determination that reached the end of the list of authorization levels, deny said user access to the node; and, based on the determination that did not reach the end of the list of authorization levels, adding "1" to the index and repeating the getting operation, the executing operation, the first determining operation and when applicable at least one of the granting operation, the second determining operation, and the denying operation using another selected authorization level that corresponds to the current index.

8. The storage device of claim 7, wherein said time includes a current date.

9. The storage device of claim 7, wherein said time includes a current time of day.

* * * * *